(12) United States Patent
Knudsen et al.

(10) Patent No.: US 11,749,982 B2
(45) Date of Patent: Sep. 5, 2023

(54) MOTOR CONTROLLER PROVIDING A DUAL-CHANNEL FUNCTIONAL-SAFETY SAFE-TORQUE-OFF FUNCTION

(71) Applicant: Danfoss Power Electronics A/S, Gråsten (DK)

(72) Inventors: Per Knudsen, Graasten (DK); Ansgar Nielsen, Aabenraa (DK); Henrik Rosendal Andersen, Graasten (DK)

(73) Assignee: DANFOSS POWER ELECTRONICS A/S, Gråsten (DK)

( * ) Notice: Subject to any disclaimer, the term of this patent is extended or adjusted under 35 U.S.C. 154(b) by 167 days.

(21) Appl. No.: 17/206,366

(22) Filed: Mar. 19, 2021

(65) Prior Publication Data

US 2021/0296882 A1 Sep. 23, 2021

(30) Foreign Application Priority Data

Mar. 23, 2020 (DE) .......................... 102020107933.8

(51) Int. Cl.
*H02P 23/14* (2006.01)
*H02P 27/08* (2006.01)
*H02H 7/08* (2006.01)

(52) U.S. Cl.
CPC .......... *H02H 7/0844* (2013.01); *H02P 23/14* (2013.01); *H02P 27/085* (2013.01)

(58) Field of Classification Search
CPC ...... H02H 7/0844; H02H 7/122; H02P 27/08; H02P 27/085; H02P 23/14
See application file for complete search history.

(56) References Cited

U.S. PATENT DOCUMENTS

| | | | | |
|---|---|---|---|---|
| 7,279,862 | B1* | 10/2007 | Welchko | G05B 9/02 318/563 |
| 10,530,147 | B2* | 1/2020 | Itten | H02P 29/0241 |
| 2014/0062368 | A1* | 3/2014 | Roessler | B60L 50/51 363/55 |
| 2014/0368147 | A1* | 12/2014 | Barrenscheen | H02H 3/083 361/93.9 |
| 2016/0261107 | A1* | 9/2016 | Itten | H02P 27/06 |

FOREIGN PATENT DOCUMENTS

DE 10 2017 124 827 A1 5/2018

OTHER PUBLICATIONS

IXYS Power, "Phase Leg IGBTwith an Inegrated Driver Module", 2016, Milpitas, CA, USA (Ref: IXRD100103-0116).
"Optokoppler". Wikipedia, Stand: Dec. 24, 2019, URL: https://de.wikipedia.org_w_index.php title=Optokoppler&oldid=195197236.

* cited by examiner

*Primary Examiner* — Thai T Dinh
(74) *Attorney, Agent, or Firm* — McCormick, Paulding & Huber PLLC

(57) ABSTRACT

The present invention relates to a motor controller providing a dual-channel func-tional-safety (FS) safe-torque-off (STO) function when controlling a motor. The motor controller includes an inverter with low-side switches and high-side switches, a low-side gate drive connected to the low-side switches, a high-side gate drive connected to the high-side switches, a first functional-safety safe-torque-off circuit connected to the high-side gate drive and a second functional-safety safe-torque-off circuit connected to the low-side gate drive, and a non-reinforced high-voltage isolation barrier.

15 Claims, 1 Drawing Sheet

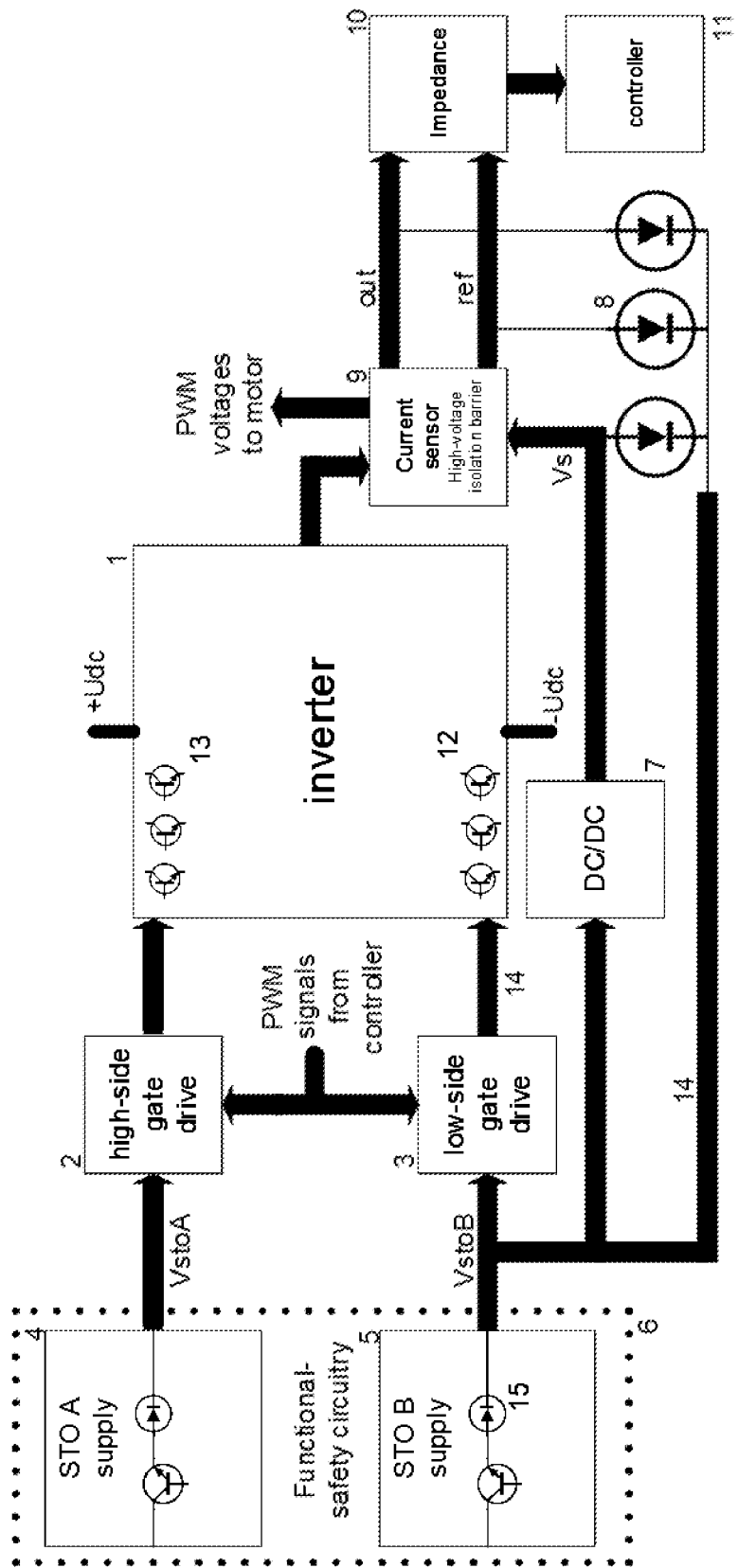

MOTOR CONTROLLER PROVIDING A DUAL-CHANNEL FUNCTIONAL-SAFETY SAFE-TORQUE-OFF FUNCTION

CROSS-REFERENCE TO RELATED APPLICATION

This application claims foreign priority benefits under 35 U.S.C. § 119 to German Patent Application No. 102020107933.8 filed on Mar. 23, 2020, the content of which is hereby incorporated by reference in its entirety.

TECHNICAL FIELD

The present invention relates to a motor controller providing a dual-channel functional-safety (FS) safe-torque-off (STO) function when controlling a motor. The motor controller comprises an inverter with low-side switches and high-side switches, a low-side gate drive connected to the low-side switches, a high-side gate drive connected to the high-side switches, a first functional-safety safe-torque-off circuit connected to the high-side gate drive and a second func-tional-safety safe-torque-off circuit connected to the low-side gate drive and a non-reinforced high-voltage isolation barrier with a hardware fault tolerance of zero (HFT=0) against random faults, which according to IEC 61800-5-2 cannot be fault-excluded giving a potential common-cause problem for the STO function. Hence, the high-voltage isolation barrier may be considered functional isolation or basic isolation as a maximum according to IEC 61800-5-1.

BACKGROUND

The motor controller may comprise further control circuits and a main circuit spanned by a rectifier and/or DC-link. The inverter stage may be provided for feeding an electrical motor with torque-producing currents. It may employ a control-unit (CU) and a power-unit (PU) section. Typically, CU control circuits are DVC A (Decisive Voltage Class A) circuits according to IEC 61800-5-1, meaning they are safe to touch. Sometimes the control circuits of the PU are DVC C circuits according to IEC 61800-5-1, meaning they are not safe to touch. Typically, the control-circuit reference is the negative DC-link rail in such a PU. In this case, the CU and PU may communicate via a reinforced galvanically-isolated interface e.g. by employing optocouplers.

As an example according to IEC 61800-5-2, a known method to derive a dual-channel FS STO function for a motor controller is to disable or enable the low- and high-side gate drives of a two-level inverter independently by two separate FS STO circuits without requirements for switching off the power to the main circuit. This concept represents known prior art and is the starting point for the present invention.

A separated dual-channel structure is typical, when a FS STO function is claimed to be tolerant towards a single fault (HFT=1), as it simplifies each channel design. In this case, it is required to analyse the dual-channel structure in terms of common-cause faults, where a single fault may damage both channels.

A part of the dual-channel FS STO circuits may be a DVC-C circuit in the PU, meaning they are typically referred to the negative DC-link rail without reinforced isolation to high-voltage circuits according to IEC 61800-5-1. The idea of having DVC-C referenced control circuitry in the PU is to simplify the hardware design. It may not be realistic to design a motor controller differently in order to com-ply with the overall requirements for the product without the DVC-C reference. This may give a challenge in terms of common-cause faults. As an example, a high-voltage isolation-barrier fault, which cannot be excluded at a non-reinforced or at a HFT=0 design according to IEC 61800-5-2, may damage the FS-STO circuitry due to leakage- or breakdown-current stress.

Damaged FS circuitry caused by a fault of an isolation barrier may be tolerated, if it is shown that, the motor controller has entered a safe state prior to the FS-circuit damage. As an example, a safe state of the motor controller is a permanently inoperative inverter module, preventing the motor controller from feeding an electrical motor with torque-producing currents regardless of the state of the control circuitry and FS STO circuits. An n-phase inverter module shall have minimum n−1 phase legs inoperative to achieve such a safe state.

Examples of a non-reinforced, high-voltage isolation barrier in a motor controller with DVC-C control circuitry could be a temperature sensor inside an inverter module, a current sensor, a resistive voltage divider for sensing voltage or for example a level-shifter gate drive IC as known in the art for controlling high-side inverter switches from a low-side DC-link rail reference. Alternatively, the high-voltage isolation barrier may simply be the distance between two PCB tracks or two voltage nodes in general, not having enough distance between them to claim a reinforced clearance or creepage according to IEC 61800-5-1. Alternatively, the high-voltage isolation barrier may be a solid isolator, as defined in IEC 61800-5-1, not capable of meeting all requirements in said standard.

Considering the above, the obvious solution for those skilled in the art would be to go for solutions isolating the FS STO circuits to prevent damage at an isolation fault by for example employing impedance separation or reinforced insulation. Alternatively, an obvious solution would be to design a high-voltage isolation barrier with HFT=1. As an example, a resistive voltage divider (high-voltage isolation barrier) for measuring the DC input voltage for the inverter module could be designed with two series-coupled high-voltage resistor to claim HFT=1, where both resistors are designed to withstand the full voltage to avoid systematic design errors. Such design methods would be a preferred design philosophy for those skilled in the art. Acknowledging that the above preferred design methods may not be realistic always, the present invention turns these default approaches up-side-down and instead connects the FS STO circuitry, designed to have impedance separation at the output, directly to the non-reinforced isolation-barrier circuit, while at the same time connecting the non-reinforced isolation-circuit barrier to the gate drives of the low-side switches via a low-impedance path. As an example, the impedance separation at the output of an STO channel may be a blocking diode.

SUMMARY

The aim of the invention is therefore to provide a motor controller, which can be brought into a safe state prior to having a potential FS-circuit damage at a high-voltage isolation-barrier fault to avoid compromising the overall design of the motor controller.

Accordingly, the present invention solves the problem of providing a functional-safety safe-torque-off function for a motor controller by the controller described in claim 1. Preferable embodiments of the controller are described in the dependent claims.

The present invention is directed at a motor controller for controlling at least one electric motor. The motor controller comprises an inverter with low-side switches and high-side switches, a low-side gate drive connected to the low-side switches, a high-side gate drive connected to the high-side switches, a first func-tional-safety safe-torque-off circuit connected to the high-side gate drive and a second functional-safety safe-torque-off circuit connected to the low-side gate drive and a non-reinforced high-voltage isolation barrier or an high-voltage isolation barrier with HFT=0. According to the invention, at least one of the functional-safety safe-torque-off circuits and the low-side switches are connected to the non-reinforced high-voltage isolation barrier via a low-impedance path. Hence, the high energy rates at an isolation failure can be directed from the high-voltage isolation barrier to the at least one of the functional-safety safe-torque-off circuits and the low-side switches, in effect destroying at least n−1 low-side inverter switches of a n-phase inverter and thereby achieving a safe state prior to a potential dangerous loss of the functional-safety safe-torque-off function due to the high-voltage isolation failure.

The present motor control is therefore designed to achieve a safe state at a potential dangerous common-cause fault by purposely damaging some of the components inside the motor controller or motor drive via a low impedance path guiding the excessive fault energy towards the gates of the low-side inverter switches.

Hence, the gate drive and/or the gate of the switching device itself is permanently damaged by raising the voltage above 80 V, which would cause the gate of a state-of-the-art IGBT switching device to fail by a breakdown giving a permanently inoperative switching device. Selectivity is ensured by designing the impedance separation at the output of a STO channel to withstand a voltage higher than 80 V, such as employing a 100 V blocking diode. Hence, the inverter would be permanently damaged, before a STO channel fails.

In a preferred embodiment of the invention, the non-reinforced high-voltage isolation barrier is a temperature sensor inside the inverter, a current sensor, a resistive voltage divider for sensing voltage and/or a level-shifter gate drive integrated circuit (IC) or similar. Alternatively, the high-voltage isolation barrier may simply be the distance between two PCB tracks or two voltage nodes in general, not having enough distance between them to claim a reinforced clearance or creepage according to IEC 61800-5-1. Alternatively, the high-voltage isolation barrier may be a solid isolator, as defined in IEC 61800-5-1, not capable of meeting all requirements in said standard. The non-reinforced high-voltage isolation barrier may be connected to an output of the inverter and/or a motor driven by the inverter or any other high-voltage node inside the motor controller.

In another preferred embodiment of the invention, the output of the at least one functional-safety safe-torque-off circuit is connected to the non-reinforced high-voltage isolation barrier via a DC/DC converter. The converter may convert an input provided by the at least one functional-safety safe-torque-off circuit, such that it can be used by the non-reinforced high-voltage isolation barrier for e.g. measuring the current output by the motor controller into a motor driven by it.

In another preferred embodiment of the invention, the output of the at least one functional-safety safe-torque-off circuit is connected to the non-reinforced high-voltage isolation barrier via at least one bypass diode. In a particularly preferred embodiment of the invention, three bypass diodes are provided, one for each secondary pin of a current sensor used as an example for the present invention, said current sensor being both a current-sense device and a high-voltage isolation barrier, and said current sensor exhibiting a lower voltage rating (such as a typical unipolar 5 V device) than the output voltage level of the STO channel (15 V) feeding it, thus requiring a DC/DC converter. Note, in the case that the voltage rating of the applied current sensor is not a unipolar 5 V device, or it exhibits a different number of output pins, three bypass diodes may not be the preferred number. Anyway, the at least one diode may be arranged such that, it permits cur-rent flow from the non-reinforced high-voltage isolation barrier to the functional-safety safe-torque-off circuit. In case a plurality of diodes is used, said diodes may be arranged in parallel to each other and/or may each be connected to a different low-voltage pin of the non-reinforced high-voltage isolation barrier.

In another preferred embodiment of the invention, the at least one func-tional-safety safe-torque-off circuit comprises a series output diode or output impedance separation, which exhibits a higher breakdown voltage than the low-side gate drive and the gates of the low-side switches. In a particularly preferred embodiment of the invention the rating of the series output diode is 80 V or larger and generally larger than the breakdown level of the gates of the inverter switches. This embodiment ensures that the motor controller enters a safe-state prior to any potential damage of the second functional-safety safe-torque-off circuit at an isolation fault of the non-reinforced high-voltage isolation barrier, which could give common-cause effects depending on the layout principles of the negative DC-link rail referenced control circuitry and the second functional-safety safe-torque-off circuit.

In another preferred embodiment of the invention the non-reinforced high-voltage isolation barrier, such as a current sensor, is connected to a controller via an impedance block, wherein, in a particularly preferred embodiment, the controller is provided for sending PWM signals to the low- and high-side gate drives of the inverter in response to a received current-sensing signal from a cur-rent sensor functioning as the non-reinforced high-voltage isolation barrier. The controller may be a microcontroller.

BRIEF DESCRIPTION OF THE DRAWINGS

Further details and advantages of the invention will be described with reference to FIG. 1, which shows a schematic view of the motor controller architecture. In the given example, the high-voltage isolation barrier is a part of a cur-rent-sensing device. Many other examples could be given to visualise the background of the invention.

DETAILED DESCRIPTION

The motor controller is designed for controlling at least one electric motor. The motor controller may be provided in a single housing. The motor controlled by the controller is not shown in FIG. 1, as it would usually be a separate component from the motor controller. A command-signal output by the controller to the motor is indicated by an arrow captioned "PWM voltages to motor".

The motor controller comprises an inverter 1 with low-side switches 12 and high-side switches 13. The inverter may comprise direct voltage supplies—Udc and +Udc, which may be fed by an AC/DC rectification stage, such as a diode rectifier, not shown in FIG. 1. The rectifier stage may be included in the motor controller or may be fed by an external source depending on the architecture of the motor controller. A low-side gate drive 3 is connected to the low-side switches 12 of the inverter, and a high-side gate drive 2 connected to its high-side switches 13.

A first functional-safety safe-torque-off circuit 4 is connected to the high-side gate drive 2, and a second functional-safety safe-torque-off circuit 5 is connected to the low-side gate drive 3 of the inverter 1. The electric connections between the functional-safety safe-torque-off circuits 4, 5 and the gate drives 2, 3 are indicated by arrows captioned "VstoA" and "VstoB" respectively.

Both functional-safety safe-torque-off circuits 4, 5 form the functional-safety circuitry 6, providing a dual-channel functional-safety safe-torque-off function for the motor controller. The motor controller further comprises a non-reinforced high-voltage isolation barrier 9, which may be provided between the inverter 1 and the motor controlled by the present motor controller. In the given example in FIG. 1, the high-voltage isolation barrier is a secondary integrated function of the current sensor(s) block, serving to sense the output currents of the motor controller as a primary function. Hence, the torque-producing currents for the motor passes through the current sensor(s) block 9, which produces iso-lated cur-rent-sensing signals between the output pins out and rec. The current-sensor(s) block is energized at the pin Vs via the STOB channel 5 and a DC/DC-converter 7. The current sensor could be a magnetic Hall sensor device as known in the art in various forms.

According to the invention, at least one of the functional-safety safe-torque-off circuits 4, 5, and the low-side switches 12 of the inverter 1 are connected to the non-reinforced high-voltage isolation barrier 9 via a low-impedance path 14.

The connection of the at least one functional-safety safe-torque-off circuit 4, 5 to the non-reinforced high-voltage isolation barrier 9 may furthermore comprise at least one bypass diode 8 for each secondary-side pin of the current sensor to achieve a low-impedance path, as the current sensor is fed via a DC/DC converter 7 in the given example. Preferably, the second functional-safety safe-torque-off circuit 5, which is connected to the low-side gate drive 3, is connected to the non-reinforced high-voltage isolation barrier 9 via the at least one, preferably via three bypass diodes 8 per current sensor depending on the current-sensor type, in the motor controller. The at least one diode 8 may be oriented such that it permits a current flow only in the direction from the non-reinforced high-voltage isolation barrier 9 to the second functional-safety safe-torque-off circuit 5.

The at least one functional-safety safe-torque-off circuit 4, 5, in particular the second functional-safety safe-torque-off circuit 5, may comprise a series output diode 15, which exhibits a higher breakdown voltage than the low-side gate drive 3 and the gates of the low-side switches 12. The rating of the series output diode 15 may be 80 V or larger.

The non-reinforced high-voltage isolation barrier 9 may be a temperature sensor inside the inverter 1, a current sensor, a resistive voltage divider for sensing voltage and/or a level-shifter gate drive IC. Alternatively, the high-voltage isolation barrier may simply be the distance between two PCB tracks or two voltage nodes in general, not having enough distance between them to claim a reinforced clearance or creepage according to IEC 61800-5-1. Alternatively, the high-voltage isolation barrier may be a solid isolator, as defined in IEC 61800-5-1, not capable of meeting all requirements in said standard. The non-reinforced high-voltage isolation barrier may be connected to an output of the inverter and/or a motor driven by the inverter or any other high-voltage node inside the motor controller.

The inverter 1 may output a signal to the non-reinforced high-voltage isolation barrier 9, which is then passed on to the motor controlled by the controller.

The output of the at least one functional-safety safe-torque-off circuit 4, 5 may be connected to the non-reinforced high-voltage isolation barrier 9 via a DC/DC converter 7.

The output of one of the functional-safety safe-torque-off circuits 4, 5 and in particular the output of the second functional-safety safe-torque-off circuit 5 may be connected to the low-side gate drive 3 and the non-reinforced high-voltage isolation barrier 9 by, in total, three at least partially parallel branches of the low-impedance path 14.

FIG. 1 illustrates the principle of the present invention using a current sensor as a non-reinforced high-voltage isolation barrier 9 on an output phase of a motor controller without reinforced insulation with respect to FS channels STO A 4 as first functional-safety safe-torque-off circuit 4 and STO B 5 as second func-tional-safety safe-torque-off circuit 5. These two channels may be referenced to the negative DC-link rail of the motor controller.

For reasons of simplicity, each STO channel 4, 5 is sketched as a series switch, which can open and close, and hereby energize/de-energize the low-side gate drive 3 and high-side gate drive 2 respectively. The external power supply feeding STO channel 4, 5 is not shown in FIG. 1. Also, STO channels 4, 5 may have an interface to the controller 11, which is not shown in FIG. 1.

The current sensor is connected to a controller 11 via an impedance block 10. The controller 11 may be e.g. a micro controller. The impedance block 10 may receive two signals, a reference signal and an output signal from the non-reinforced high-voltage isolation barrier 9. The controller 11 sends PWM signals to the low-3 and high-side 2 gate drivers of the inverter 1 in response to the signals received from the impedance block 10.

Low-3 and high-side gate drives 2 may be fed by STO A 4 and B 5 channels separately. Each low-side gate drive 3 is connected to STO B via a low-impedance path 14.

Should the isolation of the current sensor used as a non-reinforced high-voltage isolation barrier 9 fail, the safe-state principle dictates that the current sensor is unconventionally fed directly from the STO B 5 circuit via for example the shown DC/DC converter 7. Hence, by e.g. applying a bypass diode 8 for each of the low-voltage pins Vs, ref, out of the current sensor, they are connected to the output of STO B 5 via a low-impedance path 14.

Thus, if the low-voltage pins of the current sensor are energized by high voltage at a fault condition, this is destructively fed back to all the low-side gate drives 3 and the gates of the low-side switches 12. At the same time, the STO B 5 supply is designed with an output series diode 15, which exhibits a higher breakdown voltage than the low-side gate drivers 3 and the gates of the low-side switches 12. This ensures that, the motor controller enters a safe-state prior to any potential damage of the STO B 5 channel at an isolation fault of the current sensor. This could otherwise yield common-cause effects depending on the layout principles of the negative DC-link rail referenced control circuitry and STO B 5 channel. The worst-case breakdown-voltage of an IGBT (insulated gate bipolar transistor) is 80 V, meaning the rating of the series output diode 15 of the STO B 5 channel shall be 80 V or larger. For any other isolation barrier than the ones listed above, a similar approach may be applied. In these cases, a DC/DC supply may not be required.

The invention's main purpose is to provide a motor controller, of reduced size and reduced manufacturing costs, while fulfilling the requirement that during a safe-torque-off command the controlled motor does not turn (no movement).

The safe-torque-off function is protected in the event of a high-voltage isolation-barrier failure, as said isolation barrier is connected to both the low-side inverter switches and the output of at least one STO channel via a low-impedance path. This ensures that the motor controller enters a safe state prior to having a damaged STO function at said isolation-barrier fault.

The invention is not limited to one of the above-described embodiments, but can be modified in many ways. In particular, the invention may comprise 3-level inverters and/or n-level inverters, not shown in FIG. 1. In this case, a second STO channel feeds the low-side switches, while the first channel may feed the remaining switches.

All of the features and advantages arising from the claims, the description and the drawings, including constructive details, spatial arrangements and procedural steps, can be essential to the invention both individually and in the most varied of combinations.

What is claimed is:

1. A motor controller for controlling at least one electric motor, comprising an inverter with low-side switches and high-side switches, a low-side gate drive connected to the low-side switches, a high-side gate drive connected to the high-side switches, a first functional-safety safe-torque-off circuit connected to the high-side gate drive and a second functional-safety safe-torque-off circuit connected to the low-side gate drive and a non-reinforced high-voltage isolation barrier, wherein at least one of the functional-safety safe-torque-off circuits and the low-side switches are connected to the non-reinforced high-voltage isolation barrier via a low-impedance path, and wherein the output of the at least one functional-safety safe-torque-off circuit is connected to the non-reinforced high-voltage isolation barrier via a DC/DC converter.

2. The motor controller according to claim 1, wherein the non-reinforced high-voltage isolation barrier is a temperature sensor inside the inverter, a current sensor, a resistive voltage divider for sensing voltage and/or a level-shifter gate drive IC or similar.

3. The motor controller according to claim 2, wherein the output of the at least one functional-safety safe-torque-off circuit is connected to the non-reinforced high-voltage isolation barrier via at least one bypass diode.

4. The motor controller according to claim 2, wherein the at least one functional-safety safe-torque-off circuit comprises a series output diode or output impedance separation, which exhibits a higher breakdown voltage than the low-side gate drive and the gates of the low-side switches.

5. The motor controller according to claim 2, wherein the non-reinforced high-voltage isolation barrier is connected to a controller via an impedance block.

6. The motor controller according to claim 1, wherein the non-reinforced high-voltage isolation barrier is a distance between two voltage nodes, a distance between two PCB tracks or a solid isolator.

7. The motor controller according to claim 6, wherein the output of the at least one functional-safety safe-torque-off circuit is connected to the non-reinforced high-voltage isolation barrier via at least one bypass diode.

8. The motor controller according to claim 6, wherein the at least one functional-safety safe-torque-off circuit comprises a series output diode or output impedance separation, which exhibits a higher breakdown voltage than the low-side gate drive and the gates of the low-side switches.

9. The motor controller according to claim 1, wherein the at least one functional-safety safe-torque-off circuit comprises a series output diode or output impedance separation, which exhibits a higher breakdown voltage than the low-side gate drive and the gates of the low-side switches.

10. The motor controller according to claim 1, wherein the non-reinforced high-voltage isolation barrier is connected to a controller via an impedance block.

11. The motor controller according to claim 10, wherein the controller is provided for sending PWM signals to the low- and high-side gate drives of the inverter in response to a received current-sensing signal from a current sensor, wherein the current sensor functions as the non-reinforced high-voltage isolation barrier.

12. The motor controller according to claim 10, wherein the controller is a microcontroller.

13. A motor controller for controlling at least one electric motor, comprising an inverter with low-side switches and high-side switches, a low-side gate drive connected to the low-side switches, a high-side gate drive connected to the high-side switches, a first functional-safety safe-torque-off circuit connected to the high-side gate drive and a second functional-safety safe-torque-off circuit connected to the low-side gate drive and a non-reinforced high-voltage isolation barrier, wherein at least one of the functional-safety safe-torque-off circuits and the low-side switches are connected to the non-reinforced high-voltage isolation barrier via a low-impedance path, wherein the output of the at least one functional-safety safe-torque-off circuit is connected to the non-reinforced high-voltage isolation barrier via at least one bypass diode.

14. The motor controller according to claim 13, wherein the at least one functional-safety safe-torque-off circuit comprises a series output diode or output impedance separation, which exhibits a higher breakdown voltage than the low-side gate drive and the gates of the low-side switches.

15. A motor controller for controlling at least one electric motor, comprising an inverter with low-side switches and high-side switches, a low-side gate drive connected to the low-side switches, a high-side gate drive connected to the high-side switches, a first functional-safety safe-torque-off circuit connected to the high-side gate drive and a second functional-safety safe-torque-off circuit connected to the low-side gate drive and a non-reinforced high-voltage isolation barrier, wherein at least one of the functional-safety safe-torque-off circuits and the low-side switches are connected to the non-reinforced high-voltage isolation barrier via a low-impedance path,
wherein the at least one functional-safety safe-torque-off circuit comprises a series output diode or output impedance separation, which exhibits a higher breakdown voltage than the low-side gate drive and the gates of the low-side switches; and
wherein the rating of the series output diode is 80 V or larger and generally larger than the breakdown level of the gates of the inverter switches.

* * * * *